(12) United States Patent
Nanami et al.

(10) Patent No.: US 10,245,511 B2
(45) Date of Patent: Apr. 2, 2019

(54) NON TRANSITORY COMPUTER-READABLE STORAGE MEDIUM AND METHOD OF CONTROLLING A COMPUTER

(71) Applicant: CAPCOM CO., LTD., Osaka (JP)

(72) Inventors: Stefanus Nanami, Osaka (JP); Shusuke Iwasaki, Osaka (JP); Hitoshi Mishima, Osaka (JP)

(73) Assignee: CAPCOM CO., LTD., Chuo-Ku, Osaka (JP)

( * ) Notice: Subject to any disclaimer, the term of this patent is extended or adjusted under 35 U.S.C. 154(b) by 94 days.

(21) Appl. No.: 15/440,399

(22) Filed: Feb. 23, 2017

(65) Prior Publication Data

US 2017/0239572 A1    Aug. 24, 2017

(30) Foreign Application Priority Data

Feb. 24, 2016  (JP) ................. 2016-032748

(51) Int. Cl.
*A63F 13/00* (2014.01)
*A63F 13/53* (2014.01)
*A63F 13/57* (2014.01)
*G06T 13/60* (2011.01)
*G06T 13/80* (2011.01)

(52) U.S. Cl.
CPC ............. *A63F 13/53* (2014.09); *A63F 13/57* (2014.09); *G06T 13/60* (2013.01); *G06T 13/80* (2013.01); *A63F 2300/663* (2013.01)

(58) Field of Classification Search
CPC ...... G06T 13/40; G06T 13/60; G06T 2210/24
See application file for complete search history.

(56) References Cited

U.S. PATENT DOCUMENTS 5,245,320 A * 9/1993 Bouton ............... A63F 13/06
                                                        273/148 B
9,147,283 B1 * 9/2015 McVey ............... G06T 17/00
(Continued)

OTHER PUBLICATIONS

Capcom co., ltd, [online] Nov. 11, 2010,"Biohazard 5 Alternative Edition," Available at: <http://www.capcom.co.jp/bio5/ae/movie. html#movie> [Accessed Jan. 18, 2016] (see The Mercenaries Reunion Sheva Alomar [Office lady]).

*Primary Examiner* — David L Lewis
*Assistant Examiner* — Robert E Mosser
(74) *Attorney, Agent, or Firm* — IP Business Solutions, LLC

(57) ABSTRACT

The present invention causes a computer to function as a virtual space generating unit, a game screen displaying unit and a fluid displaying unit. The fluid displaying unit displays pseudo three-dimensional representation of fluid in a virtual space on a game screen. And the fluid displaying unit includes a two-dimensional data acquiring unit for acquiring two-dimensional data including a two-dimensional map by processing at least part of the surface of a three-dimensional object into a two-dimensional manner and a simulating unit for simulating a flow of the fluid on the two-dimensional map and displaying a simulating result on the surface of the object. The two-dimensional map includes height information of each point on the surface of the object. The simulating unit simulates the flow of the fluid on the two-dimensional map based on the height information.

5 Claims, 7 Drawing Sheets

(56) References Cited

U.S. PATENT DOCUMENTS

2004/0181382 A1* 9/2004 Hu ............................ G06T 13/60
                                                                    703/9
2008/0177519 A1* 7/2008 Miller ...................... G06T 13/60
                                                                    703/9

* cited by examiner

NON TRANSITORY COMPUTER-READABLE STORAGE MEDIUM AND METHOD OF CONTROLLING A COMPUTER

TECHNICAL FIELD

This invention relates to a non-transitory computer readable storage medium storing a game program and a controlling method of the game.

BACKGROUND OF THE INVENTION

Video games such as action games and role-playing games make characters act in a three-dimensional virtual game space corresponding to operation input by users. Various three-dimensional objects are located in the three-dimensional virtual game space and they are generated by computer graphics.

The three-dimensional objects such as a player character are located in the three-dimensional virtual game space. When the player character are attacked, visual effects of blood splattering or an attacked point turning red are shown in some cases (see Non-patent literature 1).

Non-patent literature 1: Capcom co., ltd, [online] Nov. 11, 2010, "BIOHAZARD 5 Alternative Edition," Available at: <http://www.capcom.co.jp/bio5/ae/movie.html#movie> [Accessed Jan. 18, 2016](see THE MERCENARIES REUNION Sheva Alomar[Office lady]).

SUMMARY OF THE INVENTION

Technical Problem

However, it has been difficult to show a flow of blood on the surface of the three-dimensional objects (for example, skin on the player character's arms) in the visual effect during the game. When the flow of the blood on skin on arms is reproduced, for example, it is possible to show the flow of the blood in a movie scene with a prepared character animation by making individually the flow of the blood in advance. On the other hand, the animation of the three-dimensional objects such as the player characters is unpredictable or the animation is complicated during the game. Therefore it has been difficult to calculate the flow of the fluid corresponding to the animation of the objects each time because of heavy processing load. Such problem is not limited to the flow of the blood described above and occurs when the flow of the fluid on the surface of the various three-dimensional objects is shown.

The present invention has an object to provide a storage medium and a controlling method of the game that can prevent increasing the processing load for showing the flow of the fluid on the surface of the three-dimensional objects, in a game with three-dimensional virtual space.

A game program according to the present invention includes a virtual space generating unit for generating a three-dimensional virtual space, a game screen displaying unit for displaying an image as a game screen taken by a virtual camera located in the virtual space and a fluid displaying unit for displaying pseudo three-dimensional representation of fluid in virtual space on the game screen. The fluid displaying unit includes a two-dimensional data acquiring unit for acquiring two-dimensional data including a two-dimensional map by processing at least part of the surface of a three-dimensional object into a two-dimensional manner and a simulating unit for simulating a flow of the fluid on the two-dimensional map and displaying a simulating result on the surface of the object. The two-dimensional map includes height information of each point on the surface of the object. The simulating unit simulates the flow of the fluid on the two-dimensional map based on the height information.

The two-dimensional map may be processed in order to maintain continuity of the object, as long as the flow of the fluid is simulated.

The two-dimensional map includes a first map for displaying the object and a second map different from the first map, and the second map may be processed in order to maintain continuity of the object and may be used for the flow of the fluid.

The height information may be changed based on change of position of at least part of the object.

A method of controlling a computer according to the present invention includes a virtual space generating step for generating a three-dimensional virtual space, a game screen displaying step for displaying an image as a game screen taken by a virtual camera located in the virtual space and a fluid displaying step for displaying pseudo three-dimensional representation of fluid in virtual space on the game screen. The fluid displaying step includes a two-dimensional data acquiring step for acquiring two-dimensional data including a two-dimensional map by processing at least part of the surface of a three-dimensional object into a two-dimensional manner and a simulating step for simulating a flow of the fluid on the two-dimensional map and displaying a simulating result on the surface of the object. The two-dimensional map includes height information of each point on the surface of the object. The simulating step simulates the flow of the fluid on the two-dimensional map based on the height information.

Advantages of the Invention

According to the present invention, a storage medium and a controlling method of the game that can prevent increasing the processing load for describing the flow of the fluid on the surface of the three-dimensional objects, in a game with three-dimensional virtual space, are provided.

DESCRIPTION OF EMBODIMENT

Hereinafter, a non-transitory computer-readable storage medium and a method for controlling a game according to one embodiment of the present invention will be described with reference to the drawings.

Summary of the Game

The following is an example of an action game executed on a home game console device. The action game according to one embodiment generates a three-dimensional virtual game space. A user operates a player character acting in the virtual game space. The player character fights with enemy characters for the predetermined purpose such as killing off the enemy characters or arriving at a predetermined position in the virtual game space.

Hardware Configuration

The game device 2 executing the game is shown. The game system according to the one embodiment includes the game device 2 and external devices such as a monitor (display unit) 19, a speaker 22, and a controller (manipulation unit) 24 which are connected to the game device 2. The game system can execute the game based on a game program 30A and game data 30B loaded from a disk-typed storage medium 30. Hereinafter, the game system is simply shown as the game device 2 in some cases.

Figure 1:
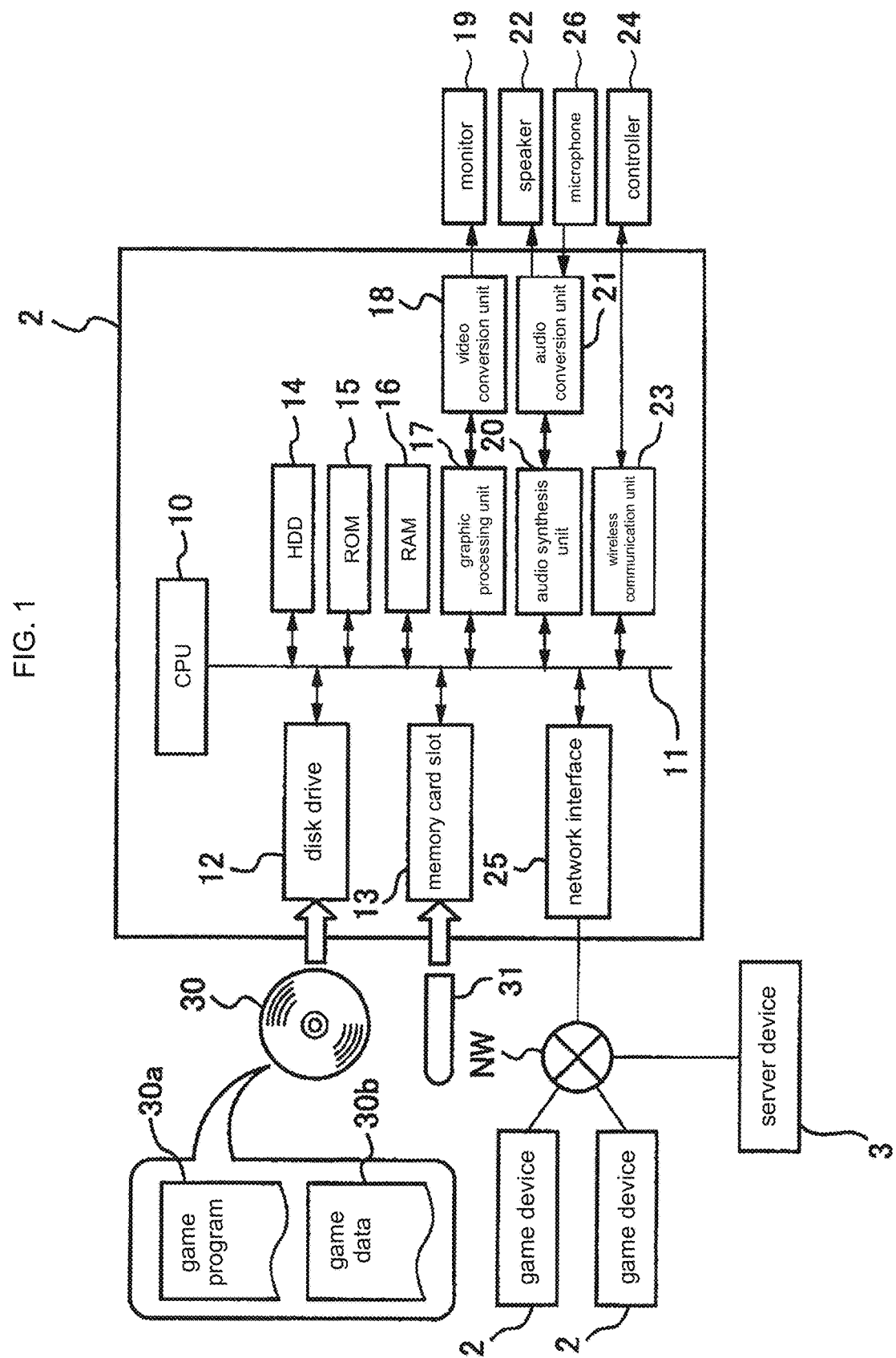
FIG. 1 is a block diagram showing a configuration of hardware in a game device according to one embodiment of the present invention.

FIG. 1 is a block diagram showing a configuration of hardware in the game device 2 according to one embodiment. As shown in FIG. 1, the game device 2 can communicate to other game devices 2 and a server 3 in both ways via a communication network NW such as Internet or a local area network (LAN). The game device 2 has a central processing unit (CPU) 10 for controlling the game device 2. The CPU 10 is connected to a disk drive 12, a memory card slot 13, a hard disk drive (HDD) 14 for storing a program, a read only memory (ROM) 15, and a random access memory (RAM) 16 via a bus 11.

Also, the CPU 10 is connected to a graphic processing unit 17, an audio composition unit 20, a wireless communication unit 23, and a network interface 25 via the bus 11.

The graphic processing unit 17 draws a game image including the virtual game space and characters in response to instructions from the CPU 10. The graphic processing unit 17 is connected to an external monitor 19 via the video conversion unit 18. The game image drawn by the graphic processing unit 17 is converted to a video format, and the video is displayed on the monitor 19.

The audio synthesis unit 20 plays and synthesizes digital game sounds in response to instructions from the CPU 10. The audio synthesis unit 20 is connected to the external speaker 22 via an audio conversion unit 21. Therefore, the game sounds played and synthesized by the audio synthesis unit 20 are decoded to an analog format by the audio conversion unit 21 and are output to outside from the speaker 22.

The audio conversion unit 21 encodes user's voices input from a headset connected to the game device 2 or a microphone 26 embedded in the controller 24 into digital format data. The audio synthesis unit 20 can acquire the digital format data and can send acquired data to the CPU 10 as input data.

The wireless communication unit 23 has a 2.4 GHz band wireless communication module. The wireless communication unit 23 is connected to the controller 24 wirelessly, and can send and receive data. The user inputs signals into the game device 2 by manipulating control elements such as buttons on the controller 24 and can control an action of the player character displayed in the monitor 19. Also, the network interface 25 connects the game device 2 to the communication network NW such as the Internet or LAN. The game device can communicate with other game devices 2 or the server 3. The game device 2 is connected to other game devices 2 via the communication network NW. Each of the game devices 2 sends and receives data. Each of the game devices 2 can display multiple player characters in the same virtual game space in synchronization. Therefore, a multiplay, in which multiple player characters corresponding to multiple users fight with enemy characters together or fight with other player characters, is executable.

Functional Configuration of the Game Device

Figure 2:
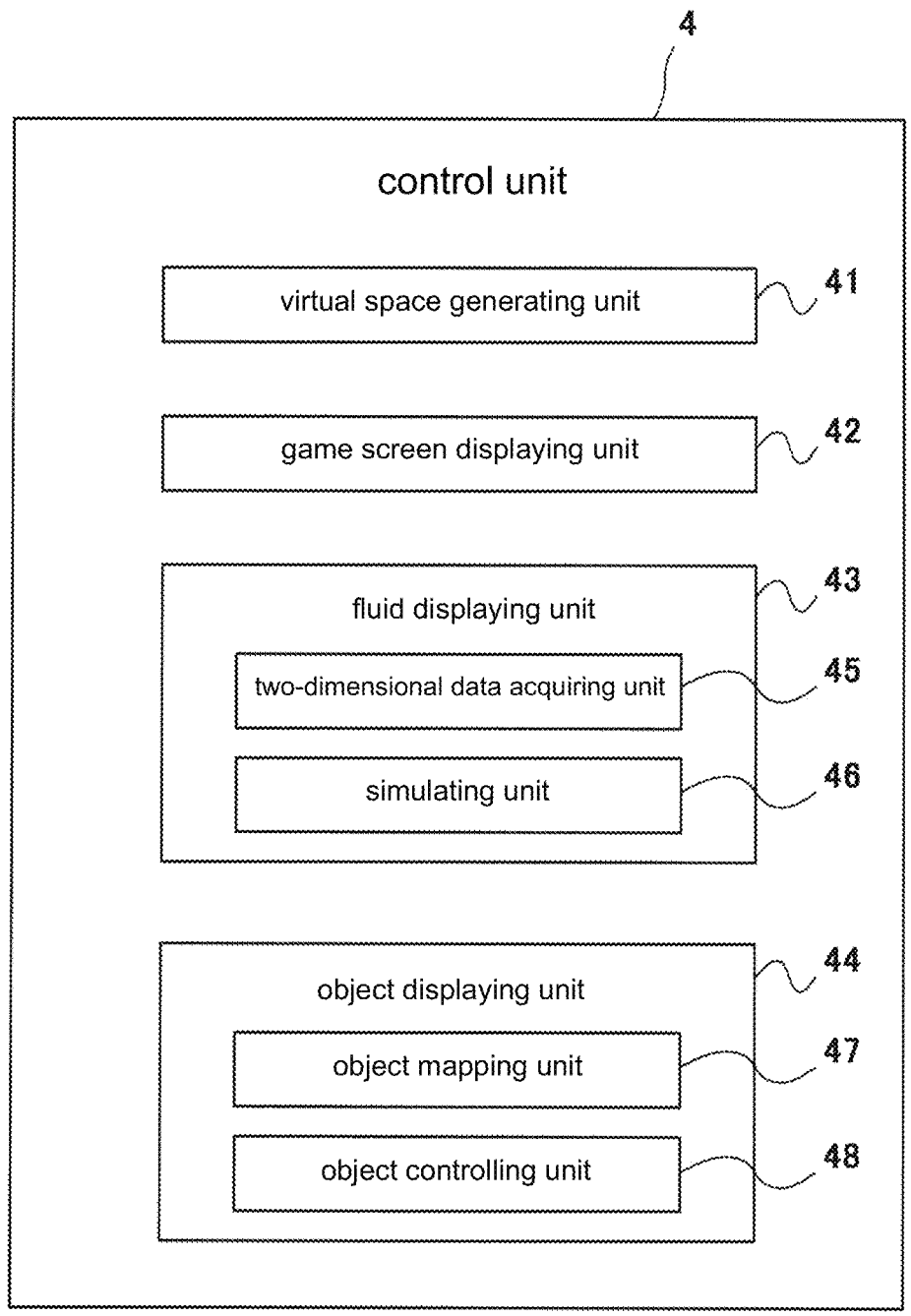
FIG. 2 is a block diagram showing a functional configuration of the game device shown in FIG. 1.

FIG. 2 is a block diagram showing a functional configuration of the game device shown in FIG. 1. The game device 2 operates as a computer including a control unit 4 including the CPU 10, the HDD 14, the ROM 15, the RAM 16, the graphic processing unit 17, the video conversion unit 18, the audio synthesis unit 20, the audio conversion unit 21, the network interface 25, and the like. As shown in FIG. 2, the control unit 4 of the game device 2 operates as a virtual space generating unit 41, a game screen displaying unit 42, a fluid displaying unit 43, and an object displaying unit 44 by executing the game program 30A. The fluid displaying unit 43 includes a two-dimensional data acquiring unit 45 and a simulating unit 46. The object displaying unit 44 includes an object mapping unit 47 and an object controlling unit 48.

The virtual space generating unit 41 generates a third-dimensional virtual space. The virtual space is a game space in which the player character operated by the user acts. The object displaying unit 44 generates fixed objects located in the virtual space and/or moving objects such as player characters moving in the virtual space. For example, the object displaying unit 44 loads data about objects, textures, and so on included in game data 30b and arranges them in the three-dimensional virtual space, in response to the moving player character.

Figure 3:
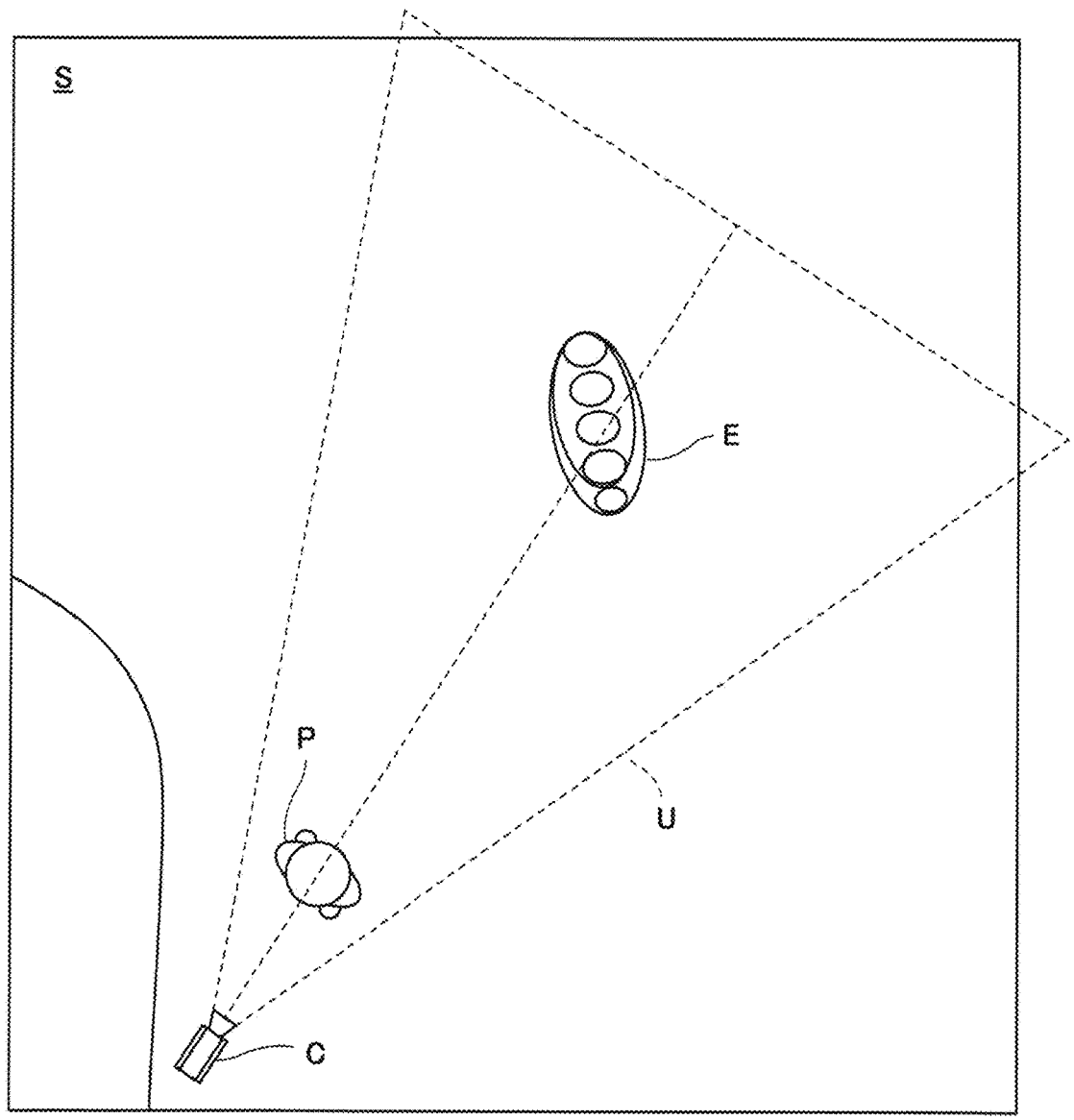
FIG. 3 is a plane view showing a three-dimensional virtual space according to one embodiment of the present invention.
Figure 4:
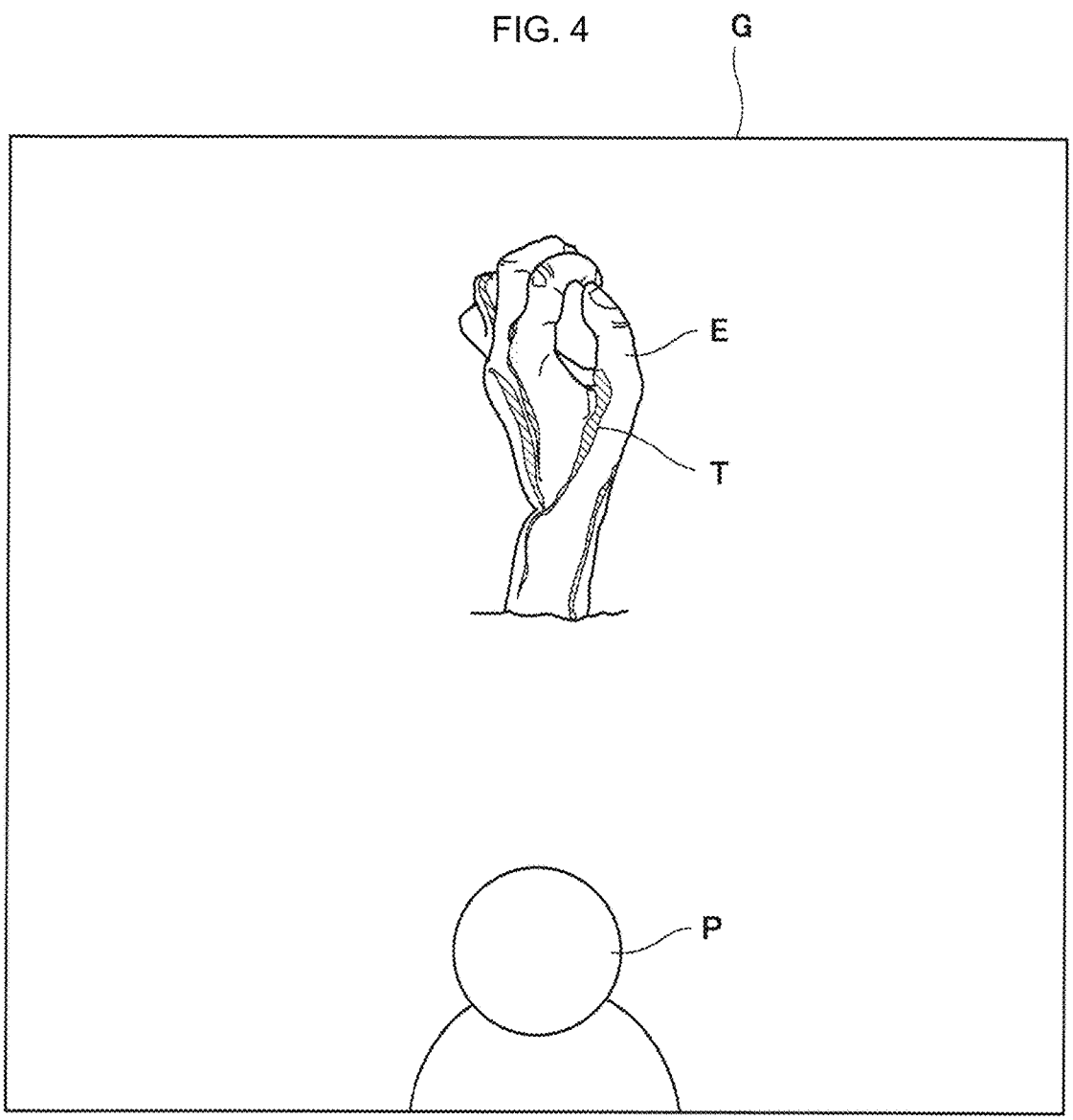
FIG. 4 is a view showing a game screen according to one embodiment of the present invention.

FIG. 3 is a plane view showing a three-dimensional virtual space in the present embodiment. FIG. 4 is a view showing a game screen in the present embodiment. As shown in FIG. 3, in the three-dimensional virtual space S, various objects, and a virtual camera C are arranged on a landform drawn with polygons, textures, and so on. In the example of FIG. 3, a player character P operable by user via the controller 24 and a non-player object E are located in the virtual space S as the moving objects.

The object displaying unit 44 functions as the object control unit 48, and controls actions of the player character corresponding to the user who operates the computer in response to operation input of the controller 24 by the user or a progress status of the game. The object control unit 48 also controls actions of the moving objects other than the player character P. The moving objects include movable objects other than the player character P and the non-player object E. For example, the moving objects include vehicles such as cars and airplanes, flying objects such as balls, bombs, bullets and arrows, animals, and fixed objects such as furniture that is spattered by burst.

The game screen displaying unit 42 displays images that are taken by the virtual camera C located in the virtual space S as a game screen G (FIG. 4) on the monitor 19. The moving objects P and E included in a shooting range U of the virtual camera C are displayed on the game screen G.

The fluid displaying unit 43 displays three-dimensional representation of fluid T in the virtual space S on the game screen G. According to one embodiment of the present invention, as shown in FIG. 4, the blood flowing on the surface of the non-player character object E whose hand (from the wrist to end of the finger) grows on the ground is an example of fluid T. The fluid T is not limited to this. For example, gas such as fire, smoke, and vapor, or liquid such as water and blood may be applicable.

Figure 5:
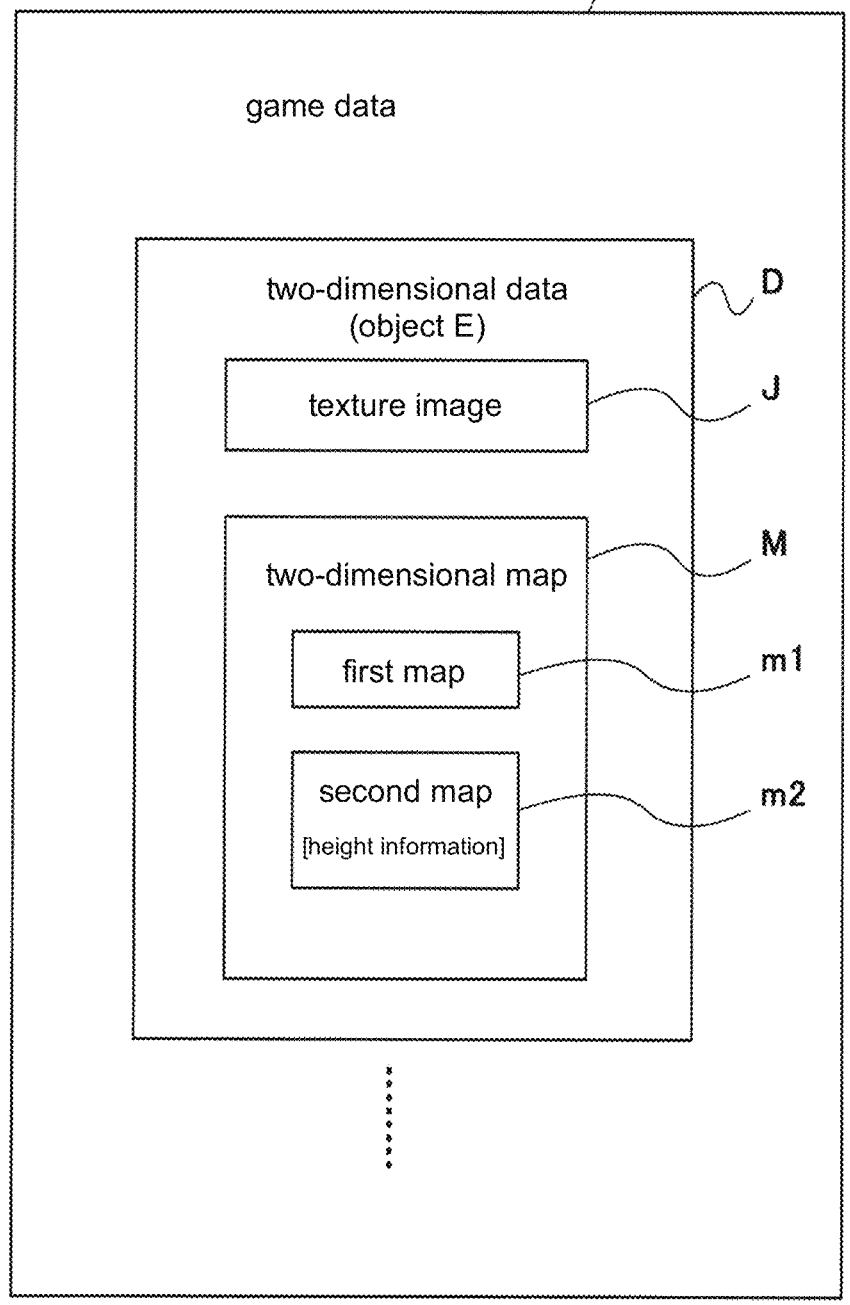
FIG. 5 is a view showing an example of a configuration of two-dimensional data of objects according to one embodiment of the present invention.
Figure 6:
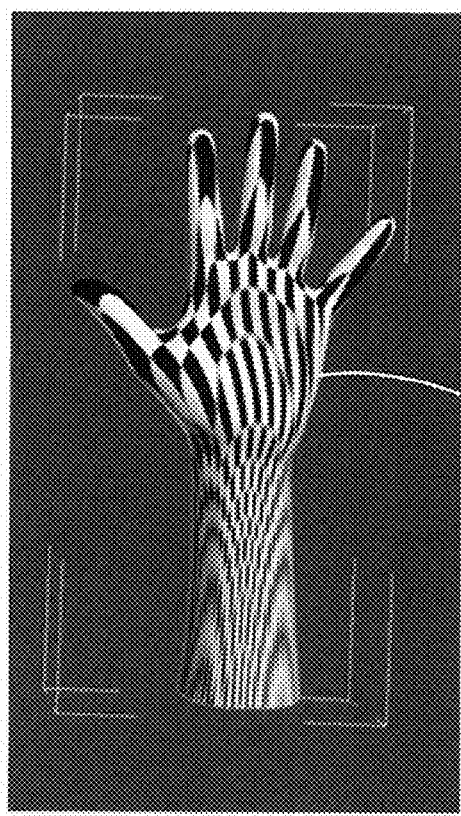
FIGS. 6A and 6B are views showing an example of a two-dimensional map of objects according to one embodiment of the present invention.
Figure 6:
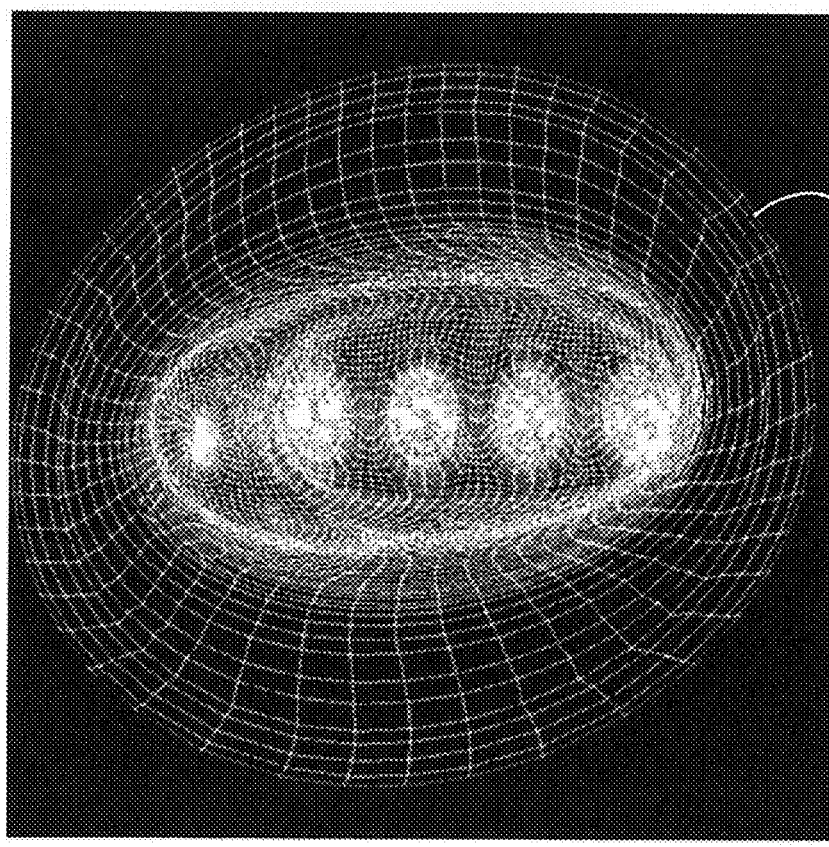

FIG. 5 is a view showing an example of a configuration of two-dimensional data of an object in the present embodiment. The game data 30*b* includes two-dimensional data D of the three-dimensional object E for drawing the object E with the fluid T. The two-dimensional data D includes a two-dimensional texture image J for mapping to at least part of three-dimensional object E and a two-dimensional map M (generally called UV map) that shows a correlation between three-dimensional coordinate (X, Y, Z) on the object surface and two-dimensional coordinate (U, V) of the texture image J. FIGS. 6A and 6B are views showing an example of a two-dimensional map of an object in the present embodiment. FIG. 6A is a view showing a three-dimensional external form of the object E. FIG. 6B is a view showing a two-dimensional map M obtained by processing the object E into a two-dimensional manner. The two-dimensional map M shown in FIG. 6B represents vertex positions, which show correspondence relationship between each vertex on polygons forming the surface of the object E and each position on the two-dimensional texture image, on the two-dimensional map. As shown in FIG. 6B, the two dimensional map M shows the border lines of the polygons, which is obtained by processing the polygon forming the surface of the object E into the two-dimensional manner. Each intersection of the border lines is vertex of each polygon. Thus the two-dimensional data D includes a development view of the three-dimensional object E in FIG. 6A.

FIGS. 6A and 6B are views showing an example of a two-dimensional map of an object in the present embodiment. FIG. 6A is a view showing a three-dimensional external form of the object E. FIG. 6B is a view showing a two-dimensional map M obtained by processing the object E into a two-dimensional manner. The two-dimensional map M shown in FIG. 6B represents vertex positions, which show correspondence relationship between each vertex on polygons forming the surface of the object E and each position on the two-dimensional texture image, on the two-dimensional map. As shown in FIG. 6B, the two dimensional map M shows the border lines of the polygons, which is obtained by processing the polygon forming the surface of the object E into the two-dimensional manner. Each intersection of the border lines is vertex of each polygon. Thus the two-dimensional data D includes a development view of the three-dimensional object E in FIG. 6A.

The two-dimensional map includes height information on the surface of the object E in the present embodiment. In the hand-shaped object E in FIG. 6A, the fingertip is upward and the wrist is downward. Thus, each pixel on the corresponding two-dimensional map M has height information that a point corresponding to the fingertip is upward and a point corresponding to the wrist is downward. Each pixel has a plurality of parameters such as color, reflectance, etc. One of the parameters is height information. Besides, each polygon (each area enclosed by the border lines (rectangle in FIG. 6B)) or each vertex (the intersection of the border lines) on the two-dimensional map M may have height information.

The two-dimensional data acquiring unit 45 acquires the two-dimensional data D including the two-dimensional map M having the height information of each pixel of the polygon forming the surface of the three-dimensional object E from the game data 30B. Then, the simulating unit 46 simulates the flow of the fluid T on the two-dimensional map M based on the height information of the two-dimensional map M and displays a simulating result on the corresponding the texture image J.

The object mapping unit 47 three-dimensionally draws the two-dimensional texture image J based on the data of the two-dimensional texture image J and the corresponding two-dimensional map M so that the predetermined position of the two-dimensional coordinate on the texture image J corresponds to the position of the three-dimensional coordinate on the surface of the object E. Thus, the three-dimensional object E having the surface on which the two-dimensional texture image J is drawn is shown in the virtual space S. Furthermore, the simulating unit 46 reflects simulating result of the flow of fluid T on the texture image J that is three-dimensionally shown by using the two-dimensional map M, and the fluid T flowing on the surface of the three-dimensional object E is shown.

The flow of the fluid T is simulated on the two-dimensional map M based on the height information included in the two-dimensional map M (that is obtained by processing the three-dimensional object E into a two-dimensional manner). The simulating unit 46 determines the direction and speed of the fluid T flowing between any two points on the two-dimensional map M based on the height difference between the two points. For example, the simulating unit 46 simulates the fluid T flowing from the higher point to the lower point. In this case, the larger the height difference between the two points is, the faster the fluid T flows. Here, a certain fluid T flowing from the lower point to the higher point may be simulated. Thus, the flow of the fluid T on the surface of the three-dimensional object E, which has a complicated form, can be simulated. Therefore, regardless of the form of the three-dimensional object, it is possible to prevent increasing the processing load for showing the flow of the fluid.

The above simulation of the fluid is based on predetermined conditions of the simulation. For example, the conditions of the simulation are configured as one or more parameters based on properties of fluid elements (categories of gas or liquid and viscosity of fluid elements), the moving direction on the starting point, the initial velocity, the direction of gravity, and so on. Additionally, the simulating unit 46 may simulate the fluid T interfered by some elements in the virtual space S. The elements in the virtual space S include an action of the object E and environmental elements such as wind and rain. Additionally, the simulation unit 46 may simulate so that the fluid T receives interference from predetermined elements, based on the position relationship in the virtual space S between the object E and the predetermined environment elements whose relative position changes in the surrounding of the object E. For example, the predetermined environment elements in the virtual space S may be the flowing of the fluid such as wind, rain, and the like, and may be a predetermined object (such as a character), which collides with the object E. In case in which the object E moves, the predetermined environment elements includes wind pressure, water pressure, or the like that the object E receives after moving.

The two-dimensional map M is processed in order to keep the continuity of the object E as long as simulating the flowing of the fluid T in the present embodiment. In other words, an area in which the fluid T may flow is contiguous in the two-dimensional map M. For example, in the case of the hand object E shown in FIG. 6A, the two-dimensional map M is processed in a circle from end of the finger to the wrist shown in FIG. 6B. In a contiguous area in the two-dimensional map M, the fluid may be simulated continuously. Therefore, when the object E is displayed in the three-dimensional manner, it looks like the fluid T flowing continuously on the object E. Accordingly, more realistic (to reduce a feeling of strangeness) fluid T may be displayed.

On the edge of the two-dimensional map M (the outer periphery in FIG. 6B), the fluid T is shown without strange feeling even if the fluid T cannot flow continuously. In the case of the object E in the present embodiment, the wrist (the edge of the two-dimensional map M) is buried in the ground shown in FIG. 4. Alternatively, the wrist may be located to be covered by the cuff of the character's clothing. In this case, it is possible to show that blood (the fluid T) flows from the cuff (arm) or blood flows from the hand to the cuff.

The object E, whose fingers turn up, is located on the ground in FIG. 4. On the other hand, the object E may move or the direction of the object E may be changed. In this case, the height information included in the two-dimensional map M is changed based on at least part of the change of the position of the object E. Consequently, the height information corresponding to each polygon is rewritten sequentially according to the change of the position or the direction of the object E. Thus, even if the object E moves or the direction of the object E is changed, the flowing of the fluid T on the surface of the object E may be changed according to the change of the position or the direction of the object E. As a result, the fluid on the moving object E may be shown simply and realistically. Besides, even if a part of the object moves, the height information corresponding to the polygon whose position has been changed is rewritten.

Another Example

The two-dimensional map M may have a height information map that is different from a map for drawing the object E. In other words, the two-dimensional map M includes a first map for drawing the object E and a second map that is different from the first map, and the second map may have the height information. FIG. 5 shows a data structure of the two-dimensional data of the object E including a first map m1 and a second map m2.

Figure 7:
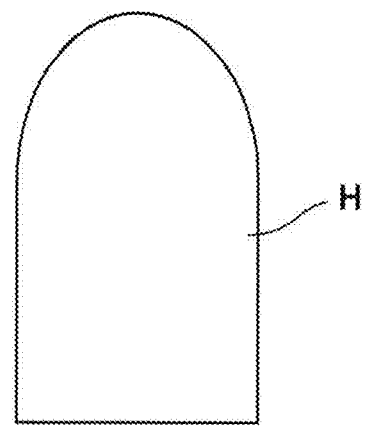
FIGS. 7A, 7B, and 7C are views showing other examples of two-dimensional data of objects according to one embodiment of the present invention.
Figure 7B:
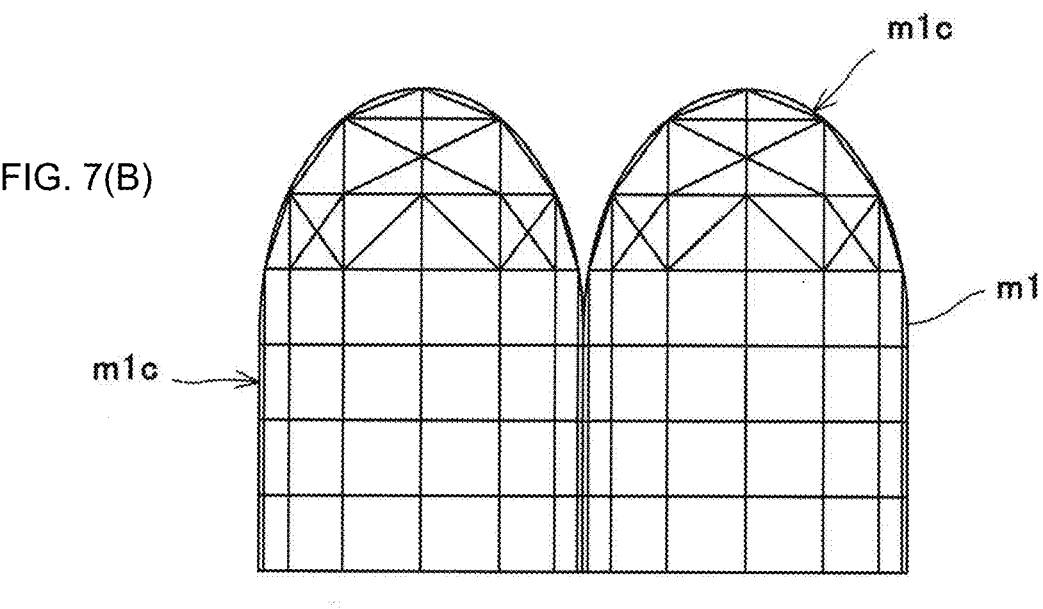
Figure 7:
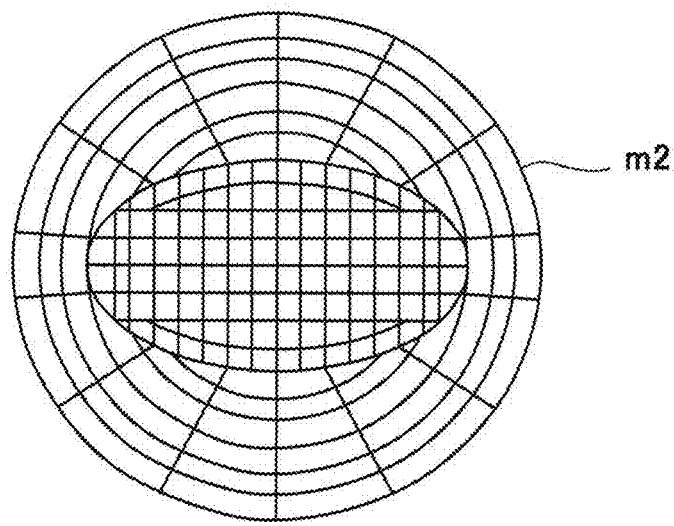

FIGS. 7A, 7B and 7C show another example of two-dimensional data of an object in the present embodiment. FIG. 7A is a side view of the object. FIG. 7B is a view showing a first map. FIG. 7C is a view showing a second map. In FIG. 7A, the object H is an example of a character's body whose cross section is a shape of an ellipse. The overall object H is a simulation area of the fluid. Accordingly, the second map m2 that is basis of the simulation is obtained by processing from the neck to the body in a circle to keep a continuity of the object H as long as simulating the flowing of the fluid shown in FIG. 7C, as is the case in FIG. 6B. The simulation unit simulates the flow of the fluid using the second map m2.

On the other hand, the first map m1 for drawing the object E is obtained by processing the waistline so that the waistline is non-continuous (a part of the circumferential direction, which is vertical against the longitudinal direction, is severed to the longitudinal direction) shown in FIG. 7B. In other words, the first map m1 includes a cut section m1c connecting between a tip section (neck) and a base end section (body). The cut section m1c is located in the side of the character including the object H. Thus, the chasm of the texture image J can be located in an inconspicuous position when the texture is drawn three-dimensionally, and the two-dimensional map can be better suited for drawing the object H.

By making the second map m2 for simulating the fluid different from a first map for drawing the object H, the way each map m1 and m2 is processed may be optimized for purpose of each map. Therefore, the fluid on the object H is shown without loss of an image quality of the object H.

The present invention may be improved, changed, and modified without departing from the broader idea and scope of the invention and not intended to be limited to the particular one embodiment (forms) disclosed above.

For example, the fluid T is displayed on the overall object E according to the above embodiment; however, the above displaying mode of the fluid is applicable to the fluid T displayed on at least a part of the object. For example, the above displaying of the fluid is applicable when the fluid is displayed on only the hands and the head of the character. Also, how the two-dimensional map M is processed is not limited to the above example of the embodiment and a variety of processing may be used. In this case, as described above, the second map including height information for simulating the fluid may be different from the first map for drawing the object, or a common map may be used.

According to the above embodiment, an example of an action game is shown; however, the present invention is applicable to various games using a three-dimensional virtual space such as a role playing game, a simulation game, and a shooting game.

The above embodiment is disclosed in the form of such stationary game consoles. However, the present invention can be applied to mobile game consoles, mobile phones, personal computers, etc.

INDUSTRIAL APPLICABILITY

The present invention is applicable to a game program and a controlling method of the game, in which the game has the three-dimensional virtual space, and is prevented from increasing processing load for showing richly the flow of the fluid on the surface of the three-dimensional objects.

REFERENCE SIGNS LIST 2 game device
30a game program
30b game data
41 virtual space generating unit
42 game screen displaying unit
43 fluid displaying unit
45 two-dimensional data acquiring unit
46 simulating unit
C virtual camera
S virtual space
T fluid

The invention claimed is:

1. A non-transitory computer-readable storage medium storing a program for driving a computer to function as:
   a virtual space generating unit for generating a three-dimensional virtual space;
   a game screen displaying unit for displaying an image as a game screen taken by a virtual camera located in the virtual space;
   an object displaying unit for displaying an object including a polygon in the three-dimensional virtual space, the polygon including first and second vertexes including first and second heights respectively which indicate how high the first and second vertexes are located in the virtual space; and
   a fluid displaying unit for displaying pseudo three-dimensional representation of fluid in the virtual space on the game screen;
   wherein the fluid displaying unit includes a two-dimensional data acquiring unit for acquiring two-dimensional data including a two-dimensional map by processing at least part of the surface of the three-dimensional object into a two-dimensional manner, and a simulating unit for simulating a flow of the fluid based on the first and second heights on the two-dimensional map and displaying a simulating result on the surface of the object.

2. The non-transitory computer-readable storage medium according to claim 1, wherein the two-dimensional map is processed contiguously as long as the flow of the fluid is simulated.

3. The non-transitory computer-readable storage medium according to claim 1, wherein the two-dimensional map includes a first map for displaying the object and a second map different from the first map, wherein the second map is processed in order to maintain continuity of the object and is used for the flow of the fluid.

4. The non-transitory computer-readable storage medium according to claim 1, wherein the first and second heights are changed based on change of position of at least a part of the object.

5. A method of controlling a computer comprising:

generating a three-dimensional virtual space;

displaying an image as a game screen taken by a virtual camera located in the virtual space;

displaying an object including a polygon in the three-dimensional virtual space, the polygon including first and second vertexes including first and second heights respectively which indicate how high the first and second vertexes are located in the virtual space displaying pseudo three-dimensional representation of fluid in the virtual space on the game screen;

wherein the displaying the pseud three-dimensional representation includes acquiring two-dimensional data including a two-dimensional map by processing at least part of the surface of the three-dimensional object into a two-dimensional manner, and simulating a flow of the fluid based on the first and second heights on the two-dimensional map and displaying a simulating result on the surface of the object.

* * * * *